(12) United States Patent  
Sato

(10) Patent No.: US 9,565,412 B2  
(45) Date of Patent: Feb. 7, 2017

(54) IMAGE PROCESSING APPARATUS THAT DEVELOPS PHOTOGRAPHED DATA, IMAGE PROCESSING METHOD, AND RECORDING MEDIUM

(71) Applicant: CANON KABUSHIKI KAISHA, Tokyo (JP)

(72) Inventor: Noriaki Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 161 days.

(21) Appl. No.: 14/625,851

(22) Filed: Feb. 19, 2015

(65) Prior Publication Data

US 2015/0244999 A1 Aug. 27, 2015

(30) Foreign Application Priority Data

Feb. 21, 2014 (JP) .................................. 2014-031632

(51) Int. Cl.
*H04N 9/73* (2006.01)
*H04N 1/60* (2006.01)

(52) U.S. Cl.
CPC ............ *H04N 9/735* (2013.01); *H04N 1/6005* (2013.01); *H04N 1/6027* (2013.01)

(58) Field of Classification Search
CPC .... H04N 9/735; H04N 1/6005; H04N 1/6058; H04N 5/2355

(Continued)

(56) References Cited

U.S. PATENT DOCUMENTS 6,868,179 B2 * 3/2005 Gruzdev ................ H04N 1/608  
358/3.23  
7,286,702 B2 10/2007 Oohara  
(Continued)

FOREIGN PATENT DOCUMENTS

CN 1418003 A 5/2003  
CN 1536530 A 10/2004  
(Continued)

OTHER PUBLICATIONS

Office Action issued in Chinese Application No. CN201510087426.X, mailed Aug. 22, 2016. English translation provided.  
(Continued)

*Primary Examiner* — Twyler Haskins  
*Assistant Examiner* — Angel L Garces-Rivera  
(74) *Attorney, Agent, or Firm* — Rossi, Kimms & McDowell LLP

(57) ABSTRACT

An image processing apparatus which is capable of satisfactorily developing photographed data by making up a difference in saturation level between color signals through replacement of a color signal. Saturation levels of respective color signals in photographed data are calculated, and an upper limit of a dynamic range in the photographed data is determined. Based on the upper limit, replacement ratios for the color signals, which change toward the saturation levels of the color signals, are obtained. Each of the color signals is adjusted according to the upper limit. Based on the replacement ratios, a replacement process is carried out in which a color signal of which the saturation level is low is replaced with a color signal of which the saturation level is high. The photographed data on which the replacement process has been carried out is subjected to a predetermined process to obtain developed data.

19 Claims, 10 Drawing Sheets

(58) Field of Classification Search
IPC ...................................................... H04N 9/735
See application file for complete search history.

(56) References Cited

U.S. PATENT DOCUMENTS

| | | | | |
|---|---|---|---|---|
| 8,384,799 B2 * | 2/2013 | Tanabe | ................... | H04N 1/409 |
| | | | | 348/223.1 |
| 2010/0208097 A1 | 8/2010 | Tanabe | | |

FOREIGN PATENT DOCUMENTS

| CN | 1613089 A | 5/2005 |
|---|---|---|
| CN | 101729913 A | 6/2010 |
| JP | 2000013808 A | 1/2000 |
| JP | 2004328564 A | 11/2004 |
| JP | 2012085360 A | 4/2012 |

OTHER PUBLICATIONS

Office Action issued in U.S. Appl. No. 14/626,387 mailed Aug. 23, 2016.

* cited by examiner

IMAGE PROCESSING APPARATUS THAT DEVELOPS PHOTOGRAPHED DATA, IMAGE PROCESSING METHOD, AND RECORDING MEDIUM

BACKGROUND OF THE INVENTION

Field of the Invention

The present invention relates to an image processing apparatus and an image processing method which develop photographed data, as well as a recording medium, and in particular to an image processing apparatus and an image processing method which are capable of reflecting a dynamic range in photographed data on developed image data, as well as a recording medium.

Description of the Related Art

Conventionally, to develop photographed data, so-called white balance adjustments are made in which color signals are adjusted with consideration given to characteristics and photographing conditions of an image pickup apparatus which has obtained the photographed data. As a result of the white balance adjustments, for example, a gray subject is developed in gray with saturation levels of respective color signals being uniform.

However, when saturation levels of respective color signals are different even after white balance adjustments are made, no additional white balance adjustments can be performed, and hence so-called coloring may occur in a high-luminance region of an image.

For this reason, there is a method in which a clip level is set according to a saturation level of an R color signal before or after white balance adjustments, and G and B color signals after white balance adjustments are subjected to clipping at that clip level (see Japanese Laid-Open Patent Publication (Kokai) No. 2000-13808).

Also, there is a method in which whether or not each color signal has become saturated is determined after white balance adjustments, and a color signal determined to be in saturation is corrected according to saturation levels of color signals other than the color signal (see Japanese Laid-Open Patent Publication (Kokai) No. 2004-328564).

Further, there is a method in which among color signals after white balance corrections, pixels which will have blown out highlights unless they are corrected to be underexposed (desensitizing process) are detected and corrected so that their pixel values can be increased, and thereafter, a desensitizing process is carried out using a maximum exposure correction value at which information is restorable (see Japanese Laid-Open Patent Publication (Kokai) No. 2012-85360). Here, a maximum interpolation value is obtained from peripheral pixel values, and according to a pixel value of a pixel to be interpolated, this pixel value and the maximum interpolation value are mixed to obtain an interpolation value.

According to the method described in Japanese Laid-Open Patent Publication (Kokai) No. 2000-13808, however, information on color signals exceeding the clip level is lost, and as a result, the gradation of a high-luminance region cannot be expressed in a developing result.

Also, according to the method described in Japanese Laid-Open Patent Publication (Kokai) No. 2004-328564, corrections suited to saturation levels of color signals are insufficient. Namely, when a gradation in which color and luminance gradually change is developed, a tone jump in which a color signal greatly changes at a boundary between an unsaturated state and a saturated state may occur. As a result of correction using color signals with different saturation levels, coloring remains in a high-luminance region.

FIG. 14 is a diagram showing results obtained when corrections are made for a subject whose color ratio of color signals is greater than 1 in a conventional developing device.

FIG. 14 shows results obtained by correcting color signals using the method described in Japanese Laid-Open Patent Publication (Kokai) No. 2004-328564 above. In FIG. 14, the axis of abscissa indicates the signal value of a color signal to be corrected, and the axis of ordinate indicates output after correction (corrected output). The maximum value of the signal level of a color signal 40 is small, and a color signal value 41 represents an input maximum value of the color signal 40. An input maximum value of a color signal 42 is greater than that of the color signal 40. In the example shown in FIG. 14, the color ratio between the color signal 40 and the color signal 42 is 1:2, and the output of the color signal 42 after correction is twice as large as that of the color signal 40.

When the color signal 40 reaches the input maximum value 41, the color signal 40 is replaced with the color signal 42 to obtain a replacement result 43. On this occasion, in a subject whose color ratio is greater than 1, there is a difference between the color signal 40 and the color signal 42, and hence a tone jump occurs at a boundary between a pixel subjected to correction and a pixel not subjected to correction.

According to the method described in Japanese Laid-Open Patent Publication (Kokai) No. 2012-85360 above, interpolation is performed with no consideration given to an upper limit of a dynamic range. For this reason, when a color signal of which an input value is smaller than an input maximum value is interpolated at a maximum interpolation value greater than an upper limit of a dynamic range, an interpolation value may exceed the upper limit of the dynamic range. Namely, even if the upper limit is increased in an attempt to widen the dynamic range, a reverse phenomenon in which the dynamic range is narrowed may occur.

On the other hand, Japanese Laid-Open Patent Publication (Kokai) No. 2012-85360 describes that although reversal of saturation in adjustment of a dynamic range is avoided by changing the shape of a gamma curve to a non-linear shape, the change of the gamma curve affects pixels and other color signals of which a maximum correction value is smaller than an input value (signal value) and which are not required to be interpolated, and as a result, distortion due to a non-linear change in output occurs.

SUMMARY OF THE INVENTION

The present invention provides an image processing apparatus and an image processing method which are capable of satisfactorily developing photographed data by making up a difference in saturation level between color signals through replacement of a color signal, as well as a recording medium.

Accordingly, a first aspect of the present invention provides an image processing apparatus which develops photographed data to obtain developed data, comprising a saturation level calculation unit configured to calculate saturation levels of respective color signals in the photographed data, an upper limit determination unit configured to determine an upper limit of a dynamic range in the photographed data, a replacement ratio calculation unit configured to, based on the upper limit, obtain replacement ratios for the color signals, which change toward the saturation levels of the color signals, an adjustment unit configured to adjust each of the color signals according to the upper limit, a replacement process unit configured to carry out a replacement process in which a color signal of which the saturation level is low is replaced with a color signal of which the saturation level is high based on the replacement ratio, and a development process unit configured to obtain the developed data by carrying out a predetermined process on the photographed data subjected to the replacement process by the replacement process unit.

Accordingly, a second aspect of the present invention provides an image processing method for an image processing apparatus which develops photographed data to obtain developed data, comprising a saturation level calculation step of calculating saturation levels of respective color signals in the photographed data, an upper limit determination step of determining an upper limit of a dynamic range in the photographed data, a replacement ratio calculation step of, based on the upper limit, obtaining replacement ratios for the color signals, which change toward the saturation levels of the color signals, an adjustment step of adjusting each of the color signals according to the upper limit, a replacement process step of carrying out a replacement process in which a color signal of which the saturation level is low is replaced with a color signal of which the saturation level is high based on the replacement ratio, and a development process step of obtaining the developed data by carrying out a predetermined process on the photographed data subjected to the replacement process in the replacement process step.

Accordingly, a third aspect of the present invention provides a non-transitory computer-readable storage medium storing a control program for causing a computer to execute a control method for an image processing apparatus which develops photographed data to obtain developed data, the control method comprising, a saturation level calculation step of calculating saturation levels of respective color signals in the photographed data, an upper limit determination step of determining an upper limit of a dynamic range in the photographed data, a replacement ratio calculation step of, based on the upper limit, obtaining replacement ratios for the color signals, which change toward the saturation levels of the color signals, an adjustment step of adjusting each of the color signals according to the upper limit, a replacement process step of carrying out a replacement process in which a color signal of which the saturation level is low is replaced with a color signal of which the saturation level is high based on the replacement ratio, and a development process step of obtaining the developed data by carrying out a predetermined process on the photographed data subjected to the replacement process in the replacement process step.

According to the present invention, based on replacement ratios changing toward saturation levels of color signals based on an upper limit of a dynamic range, a replacement process is carried out in which a color signal with low saturation level is replaced with a color signal with high saturation level. Thus, photographed data is satisfactorily developed by making up a difference in saturation level between color signals through replacement of a color signal.

Further features of the present invention will become apparent from the following description of exemplary embodiments (with reference to the attached drawings).

BRIEF DESCRIPTION OF THE DRAWINGS

FIGS. 6A to 6D are diagrams useful in explaining RAW data after replacement, which is generated by the replacement process in FIG. 3, in which FIG. 6A is a diagram showing a state in which all color signals have reached saturation levels after WB adjustment, FIG. 6B is a diagram showing a state in which some of the color signals have reached saturation levels after WB adjustment, FIG. 6C is a diagram showing another example of the state in which some of the color signals have reached saturation levels after WB adjustment, and FIG. 6D is a diagram showing a state in which one of the color signals has reached a saturation level after WB adjustment.

FIGS. 9A and 9B are views useful in explaining an improvement in gradations in high-luminance regions by a replacement process which is carried out by a developing unit in FIG. 1, in which FIG. 9A is a view showing a conventional developing result, and FIG. 9B is a view showing a developing result according to the first embodiment.

DESCRIPTION OF THE EMBODIMENTS

A description will now be given of an exemplary image processing apparatus according to embodiments of the present invention with reference to the drawings.

Figure 1:
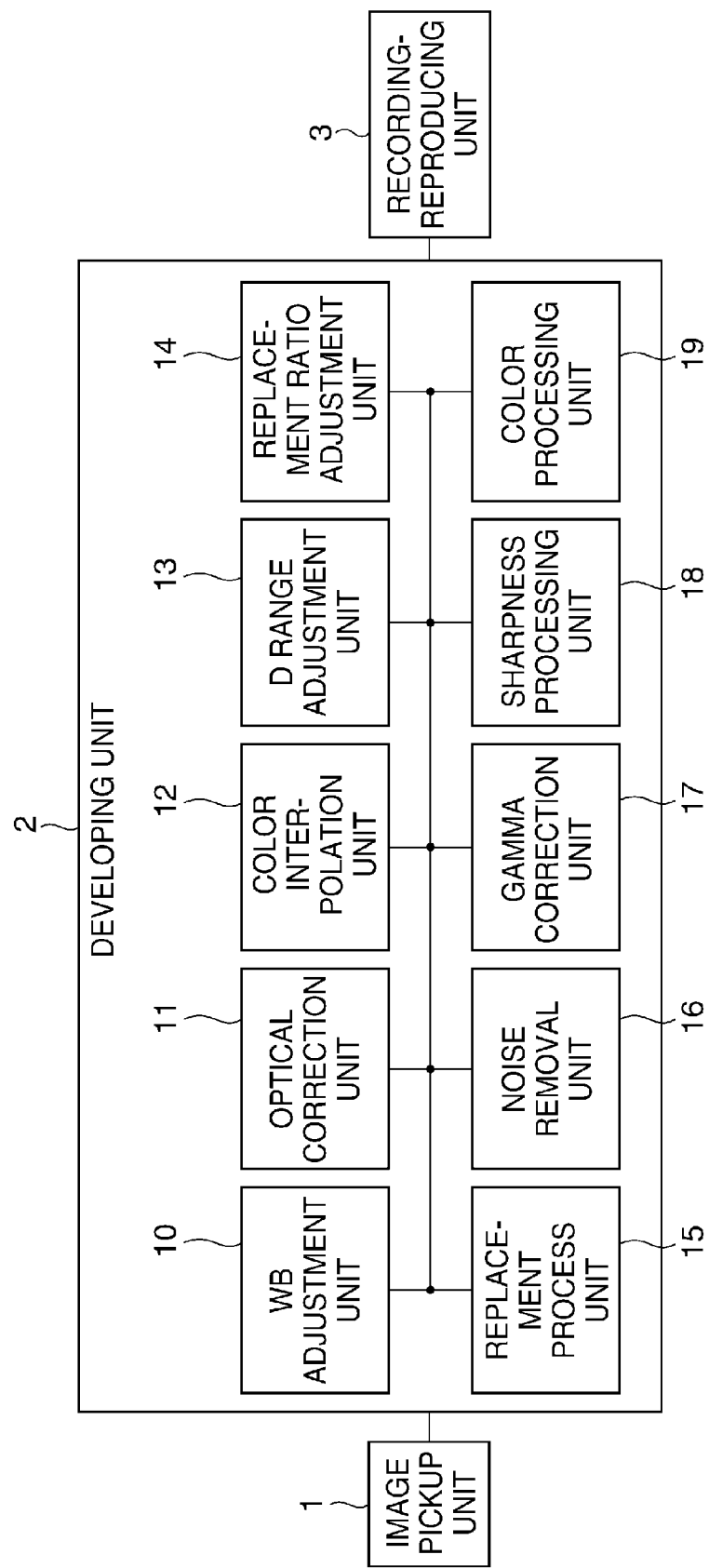
FIG. 1 is a block diagram schematically showing an arrangement of an exemplary image pickup apparatus which is an image processing apparatus according to a first embodiment of the present invention.

FIG. 1 is a block diagram schematically showing an arrangement of an exemplary image pickup apparatus which is an image processing apparatus according to a first embodiment of the present invention.

The image pickup apparatus shown in the figure is, for example, a digital camera (hereafter referred to merely as the camera) and has an image pickup unit 1, a developing unit 2, and a recording-reproducing unit 3. The image pickup unit 1 has a taking lens unit (hereafter referred to merely as the lens), an image pickup device, and a photometric measurement unit and outputs photographed data (hereafter referred to as RAW data). It should be noted that the RAW data includes undeveloped photographed data and photographed data which has been subjected to only a part of a developing process.

The developing unit 2 develops RAW data, which is an output from the image pickup unit 1, to generate developed data (that is, image data). The recording-reproducing unit 3 records RAW data, which is an output from the image pickup unit 1, and developed data, which is an output from the developing unit 2, as recorded data in an external recording device (not shown), reads the recorded data recorded in the external recording device, and supplies the same to the developing unit 2.

The camera shown in the figure has the image pickup unit 1, the developing unit 2, and the recording-reproducing unit 3 as described above and is thus able to perform development as well as photographing. At the time of photographing, the camera is able to record developed data in the external recording device, read RAW data from the external recording device with arbitrary timing, and develop the RAW data.

It should be noted that the camera may be equipped with only the image pickup unit 1 and the recording-reproducing unit 3, and RAW data may be developed using an external information processing apparatus having a developing unit and a recording-reproducing unit.

The developing unit 2 shown in the figure has a white balance (WB) adjustment unit 10, an optical correction unit 11, a color interpolation unit 12, a dynamic range (D range) adjustment unit 13, a replacement ratio adjustment unit 14, a replacement process unit 15, a noise removal unit 16, a gamma correction unit 17, a sharpness processing unit 18, and a color processing unit 19. They are connected to one another.

The WB adjustment unit 10 multiplies signal values of respective color signals in RAW data by WB coefficients (white balance coefficients). As a result, the WB adjustment unit 10 adjusts saturation levels of the color signals, and for example, outputs a gray subject in gray with the saturation levels of the respective color signals being uniform.

It is assumed here that the image pickup unit 1 extracts signal values of color signals from a part of RAW data to obtain WB coefficients and sends the WB coefficients as well as the RAW data to the developing unit 2. It should be noted that the image pickup unit 1 may determine WB coefficients by a well-known method using, for example, photometric measurement results obtained from the photometric measurement unit.

WB coefficients are values which represent the amounts of gain for respective color signals and obtained for respective color signals. By multiplying signal values of respective color signals by WB coefficients, the color signals are caused to have the same signal value in a gray subject. Here, as described above, it is assumed that the image pickup unit 1 sends WB coefficients as well as RAW data to the developing unit 2, but WB coefficients for use in photographing using a standard light source may be set in the developing unit 2 in advance.

Further, the WB adjustment unit 10 may calculate WB coefficients based on color temperatures input by a user. The WB adjustment unit 10 may not use WB coefficients added to RAW data but may calculate WB coefficients using a method designated by a user at the time of development.

Figure 2:
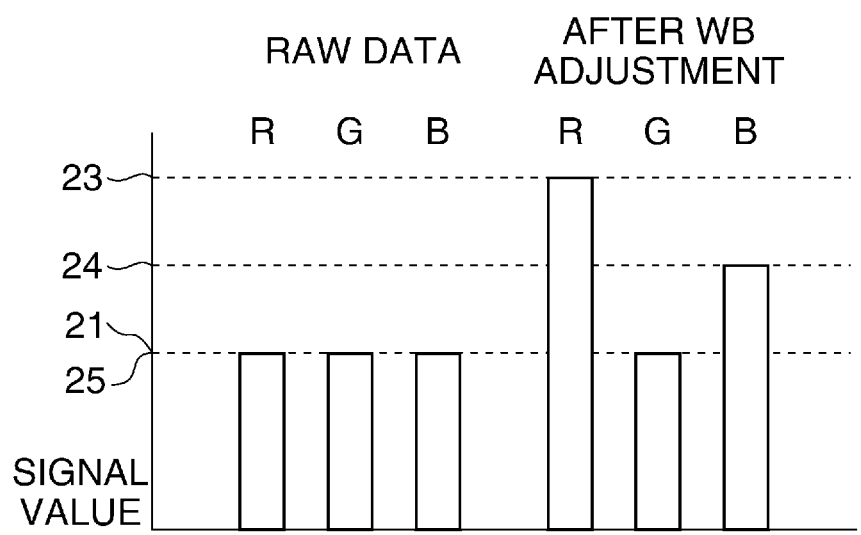
FIG. 2 is a diagram showing an exemplary WB adjustment process which is carried out by a WB adjustment unit in FIG. 1.

FIG. 2 is a diagram showing an exemplary WB adjustment process which is carried out by the WB adjustment unit 10 in FIG. 1.

Referring to FIG. 2, the axis of ordinate indicates the magnitudes of signal values of respective color signals (R, G, B). As shown in the figure, RAW data has color signals R, G, and B, and here, a sensor saturation value of the image pickup device (image sensor) is designated by a reference number 21. This sensor saturation value 21 is an upper limit to the signal values of the color signals depending on the spectral sensitivity characteristics of the image pickup device, the processing accuracy of the image pickup unit 1, and a predetermined threshold value. It should be noted that in the example shown in the figure, the sensor saturation value 21 is the same for the color signals, but the sensor saturation value 21 may vary with the color signals.

Results obtained by the WB adjustment unit 10 multiplying the RAW data shown in the figure by WB coefficients are signal values obtained after WB adjustment. Multiplication by WB coefficients changes upper limits to the respective color signals. In the example shown in the figure, it is assumed that a WB coefficient for the color signal R is "2", a WB coefficient for the color signal B is "1.5", and a WB coefficient for the color signal G is "1".

Here, a saturation level 23 for the color signal R after WB adjustment is twice as large as the sensor saturation value 21. A saturation level 24 for the color signal B is 1.5 times as large as the sensor saturation value 21. A saturation level 25 for the color signal G is equal to the sensor saturation value 21.

Referring again to FIG. 1, the optical correction unit 11, for example, reduces peripheral illumination arising from a lens provided in the image pickup unit 1, corrects for chromatic aberration of magnification, eliminates axial chromatic aberration, and corrects for distortion. The color interpolation unit 12 demosaics pixels comprised of monochrome signals.

The D range adjustment unit 13 determines an input lower limit Bk and an input upper limit (upper limit) Wt of input signals for use in development. Input values of input signals between the input lower limit Bk and the input upper limit Wt are assigned to output values of output signals by the gamma correction unit 17, to be described later, and hence by determining the input lower limit Bk and the input upper limit Wt according to the luminance distribution of photographed data or the like, developed data with high contrast is obtained. Moreover, the effect of cutting noise in shadows is obtained by increasing the input lower limit Bk, and the effect of reducing blown out highlights is obtained by increasing the input upper limit Wt.

The replacement ratio adjustment unit 14 generates replacement ratio tables for respective color signals as will be described later. It should be noted that the replacement ratio tables are monotonically-increasing tables for outputting "0" when no replacement is done and outputting "1" when complete replacement is done, where signal values of color signals are inputs.

For each pixel, the replacement process unit 15 replaces a color signal with another color signal according to the replacement ratio tables generated by the replacement ratio adjustment unit 14. The noise removal unit 16 removes luminance noise and color noise by a filtering process, a hierarchical process, or the like.

The gamma correction unit 17 adjusts the contrast and dynamic range of the entire image using a gamma curve. The sharpness processing unit 18 enhances an edge of an image to adjust the sharpness of the entire image. The color processing unit 19 adjusts the hue of an image and suppresses color curving in a high-luminance region.

Although the component elements have been described in the order of preferable processes carried out by the developing unit 2, but the order in which the processes are carried out by the developing unit 2 should not necessarily be the order described above. However, carrying out the processes in the order described above have the effect of reducing noise in an image and reducing color on an edge.

The optical correction unit 11 holds an optical correction table with respect to each model of lens, focal distance, and focus position, considering a case where no replacement process is carried out by the replacement process unit 15. Thus, when the replacement process unit 15 performs replacement of color signals prior to processing performed by the optical correction unit 11, optical correction results are over corrections.

For example, when red coloring arising from the chromatic aberration of the lens has been removed in the replacement process by the replacement process unit 15, the optical correction unit 11 makes a correction to enhance green color so as to erase the same amount of red coloring. For this reason, an image is colored with green.

Thus, to carry out the replacement process by the replacement process unit 15 prior to the correction process by the optical correction unit 11, the correction process by the optical correction unit 11 needs to have an optical correction table created with consideration given to the effect of reducing coloring by the replacement process unit 15.

It should be noted that the image pickup unit 1 may be equipped with some of the component elements of the developing unit 2 in FIG. 1, and further, the developing unit 2 may be equipped with other component elements.

Figure 3:
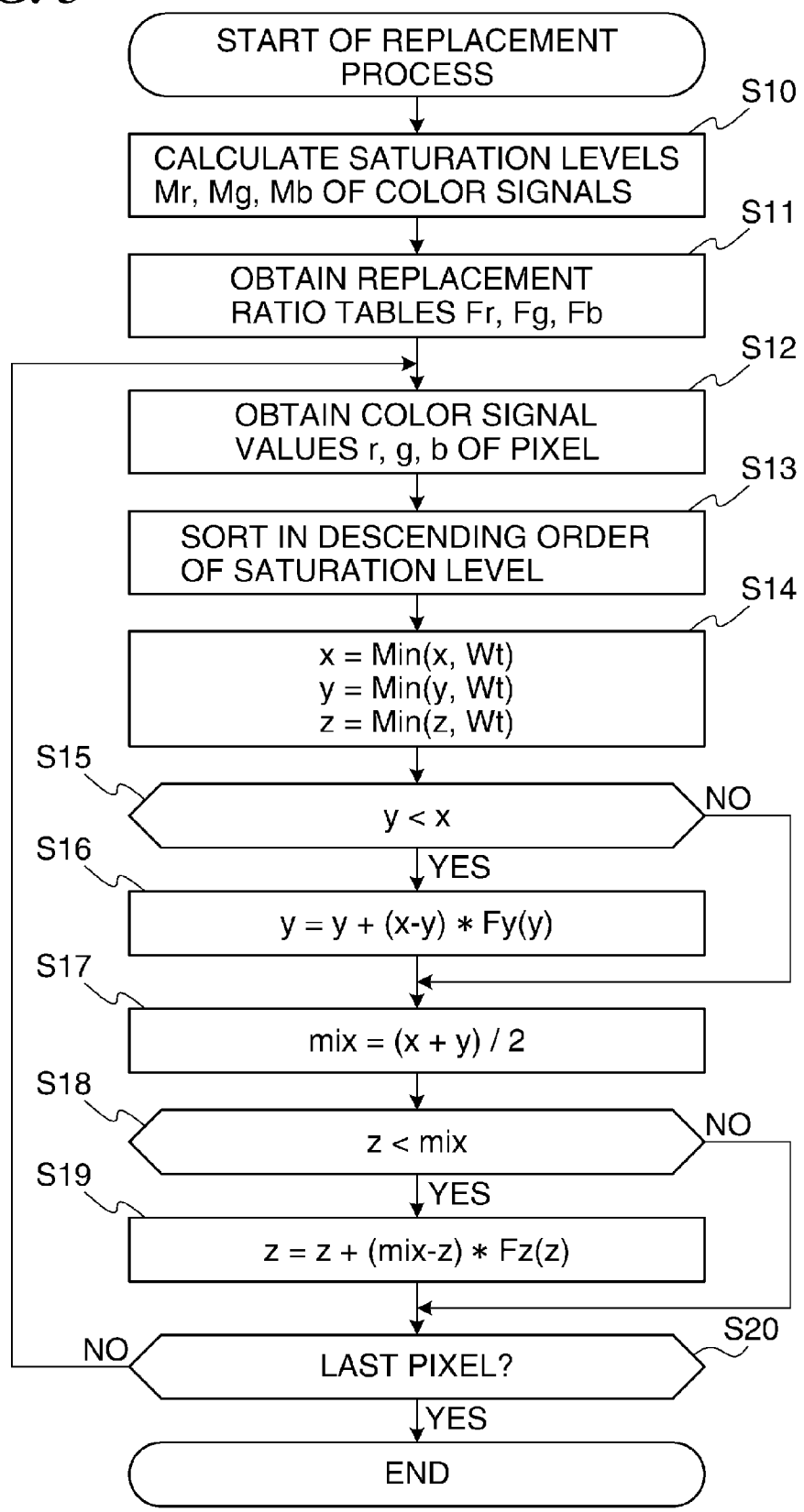
FIG. 3 is a flowchart useful in explaining an exemplary replacement process which is carried out by a replacement process unit in FIG. 1.

FIG. 3 is a flowchart useful in explaining an exemplary replacement process which is carried out by the replacement process unit 15 in FIG. 1.

Upon starting the replacement process, the replacement process unit 15 obtains saturation levels of respective color signals in RAW data (step S10). Specifically, for example, the replacement process unit 15 obtains the sensor saturation value 21 according to RAW data. The replacement process unit 15 then multiplies the sensor saturation value 21 by WB coefficients used by the WB adjustment unit 10 to calculate the saturation level 23 of the color signal R as Mr, calculate the saturation level 24 of the color signal B as Mb, and calculate the saturation level 25 of the color signal G as Mg.

The replacement process unit 15 then obtains replacement ratio tables Fr, Fg, and Fb, to be described later, from the replacement ratio adjustment unit 14 (step S11). The replacement process unit 15 then obtains signal values (color signal values) r (red), g (green), and b (blue) in the first pixel of an image (that is, RAW data) (step S12).

It should be noted that when no WB adjustment has been made in advance by the WB adjustment unit 10, the replacement process unit 15 multiplies the color signal values r, g, and b by WB coefficients. When a demosaicing process or a debayer process has not been made in advance by the color interpolation unit 12, the replacement process unit 15 makes up a shortfall in color signal values by referring to peripheral pixels.

The replacement process unit 15 then carries out a process explained hereafter for each pixel of the RAW data. First, the replacement process unit 15 sorts the saturation levels Mr, Mg, and Mb, the color signal values r, g, and b, and the replacement ratio tables Fr, Fg, and Fb in descending order of saturation level. Namely, they are sorted into saturation levels Mx, My, and Mz, color signal values x, y, and z, and replacement ratio tables Fx, Fy, and Fz (step S13).

It should be noted that when saturation levels are as shown in FIG. 2, the following equations hold: Mx=Mr, My=Mb, Mz=Mg, x=r, y=b, z=g, Fx=Fr, Fy=Fb, and Fz=Fg.

The replacement process unit 15 then adjusts the color signal values x, y, and z so that they can fall within the input upper limit Wt determined by the D range adjustment unit 13 in a manner described later (step S14). When the color signal values x, y, and z exceed the input upper limit Wt, the replacement process unit 15 carries out a threshold process in which it replaces the color signal values x, y, and z with the input upper limit Wt.

Namely, in the process in the step S14, the replacement process unit 15 carries out the threshold process represented by mathematical expressions (1) below.

[Mathematical expression 1]

$$x = \text{Min}(x, Wt)$$

$$y = \text{Min}(y, Wt)$$

$$z = \text{Min}(z, Wt) \quad (1)$$

It should be noted that in the step S14, a process in which part or all of color signal values are compressed may be carried out in place of the threshold process described above. For example, as represented by an expression (2) below, signal values from a predetermined threshold value THx to the saturation level Mx are compressed to those from the threshold value THx to the input upper limit Wt. When n=1 holds (n is a multiplier and an integer not less than 1), the replacement process unit 15 linearly compresses color signal values not less than the threshold value THx. When n=2 holds, the replacement process unit 15 non-linearly compresses color signal values so that color signal values not less than the threshold value THx can fall within the input upper limit Wt. Also, the compression process may be carried out on a color signal value for use in replacement of another color signal value, and the threshold process may be carried out on the other color signal value to be replaced.

[Mathematical expression 2]

$$x' = x - (Mx - Wt) \times \left(\frac{x - THx}{Mx - THx}\right)^n \quad (2)$$

As described above, because in the process in the step S14, all color signal values are made to fall within the input upper limit Wt before the replacement process, a phenomenon in which saturation is reversed due to replacement of signal values is prevented from occurring in adjustment of a dynamic range where color signal values exceed the input upper limit Wt.

Then, the replacement process unit 15 carries out a process explained hereafter for each pixel of the RAW data. First, the replacement process unit 15 compares the color signal values x and y with each other to determine whether or not the color signal value y<the color signal value x (step S15).

Upon determining that the color signal value y<the color signal value x (YES in the step S15), the replacement process unit 15 replaces the color signal value y with the color signal value x (step S16). In the process in the step S16, the replacement process unit 15 carries out a replacement process according to a replacement ratio table such that the closer the color signal value y to its saturation level, the higher the ratio of replacement with the color signal value x.

For example, the replacement process unit 15 obtains a replacement ratio for the color signal value y from the replacement ratio table Fy. The replacement process unit 15 multiplies a difference between the color signal value x and the color signal value y by the replacement ratio and then carries out a replacement process in which it adds the multiplication result to the color signal value y. Namely, the replacement process unit 15 obtains the color signal value y after replacement which is expressed by the following equation, $y=y+(x-y)\times Fy(y)$.

It should be noted that the replacement process unit 15 may multiply a difference between the color signal value x and the saturation level My by the replacement ratio and then carry out a replacement process in which it adds the multiplication result to the color signal value y. Further, the replacement process unit 15 may add a multiplication result obtained by multiplying the color signal value x by the replacement ratio to a multiplication result obtained by multiplying the color signal y by (1−replacement ratio).

Then, the replacement process unit 15 obtains a replacement candidate value mix which replaces the color signal value z. Specifically, for example, the replacement process unit 15 assumes an average value of the color signal value x and the color signal value y as the replacement candidate value mix. Namely, the replacement process unit 15 determines the replacement candidate value mix using the following equation, $mix=(x+y)/2$ (step S17). It should be noted that when the replacement process unit 15 determines in the step S15 that the color signal value y≥the color signal value x (NO in the step S15), the process proceeds to step S17 without the replacement process unit 15 replacing the color signal value y.

When the color signal value y is replaced in the step S16, the color signal value y after replacement is used to calculate the replacement candidate value mix. By using the color signal value y after replacement to calculate the replacement candidate value mix, the saturation level of the color signal value z after replacement is made equal to the saturation level of the color signal value x and the saturation level of the color signal value y after replacement.

Then, the replacement process unit 15 compares the color signal z and the replacement candidate value mix with each other to determine whether or not the color signal value z<the replacement candidate value mix (step S18). Upon determining that the color signal value z<the replacement candidate value mix (YES in the step S18), the replacement process unit 15 replaces the color signal value z with the replacement candidate value mix (step S19). In the process in the step S19, the replacement process unit 15 carries out a replacement process according to a replacement ratio table such that the closer the color signal value z to its saturation level, the higher the ratio of replacement with the replacement candidate value mix.

For example, the replacement process unit 15 obtains a replacement ratio for the color signal value z from the replacement ratio table Fz. The replacement process unit 15 multiplies a difference between the replacement candidate value mix and the color signal value z by the replacement ratio and then carries out a replacement process in which it adds the multiplication result to the color signal value z. Namely, the replacement process unit 15 obtains the color signal value z after replacement which is expressed by the following equation, $z=z+(mix-z)\times Fz(z)$.

It should be noted that the replacement process unit 15 may multiply a difference between the replacement candidate value mix and the saturation level Mz by the replacement ratio and then carry out a replacement process in which it adds the multiplication result to the color signal value z. Further, the replacement process unit 15 may add a multiplication result obtained by multiplying the replacement candidate value mix by the replacement ratio to a multiplication result obtained by multiplying the color signal z by (1−replacement ratio).

After the step S19, the replacement process unit 15 determines whether or not replacement has been completed for all the pixels of the RAW data. Namely, the replacement process unit 15 determines whether or not replacement has been completed up to the last pixel (step S20).

When the replacement process unit 15 determines that replacement has not been completed up to the last pixel (NO in the step S20), the process returns to the step S12 in which the replacement process unit 15 obtains color signal values r, g, and b for the next pixel. On the other hand, upon determining that replacement has been completed up to the last pixel (YES in the step S20), the replacement process unit 15 terminates replacement for the RAW data.

It should be noted that when the replacement process unit 15 determines in the step S18 that the color signal value z≥the replacement candidate value mix (NO in the step S18), the process proceeds to the step S20.

Figure 4:
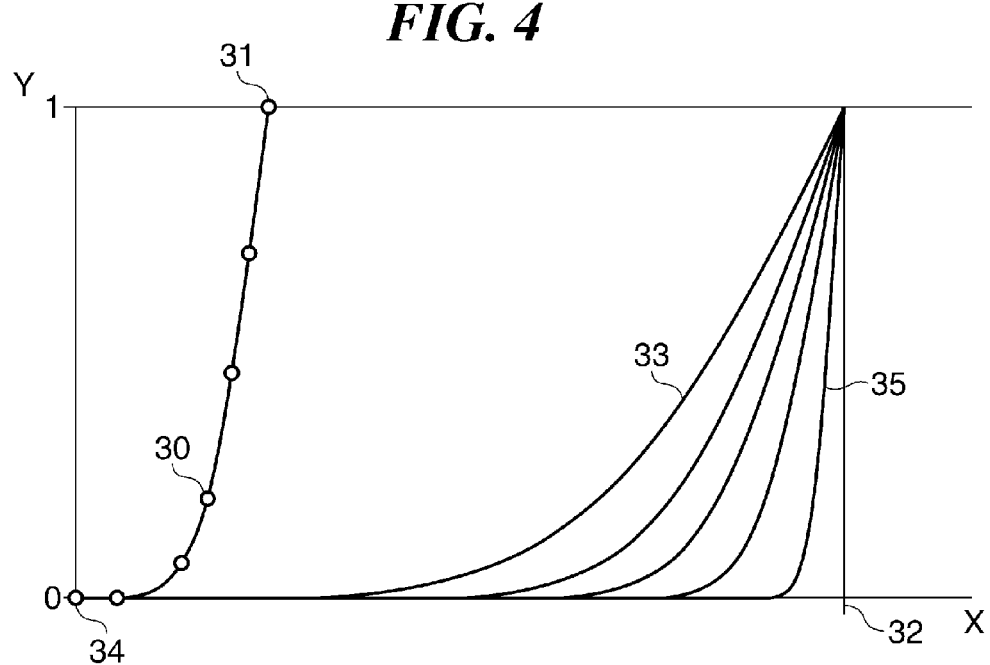
FIG. 4 is a view showing exemplary replacement ratio tables which are generated by a replacement ratio adjustment unit in FIG. 1.

FIG. 4 is a view showing exemplary replacement ratio tables which are generated by the replacement ratio adjustment unit 14 in FIG. 1.

In FIG. 4, a control point 30 represents a point of which an X coordinate is an input of a signal value of a color signal and of which a Y coordinate is an output of the signal value of the color signal. A control point 31 is a point at which an output is "1". The replacement ratio table is obtained by performing interpolation on a color signal value between control points using a linear function, a spline function, or the like.

A saturation level 32 is a saturation level of the color signal value y, and a replacement ratio table 33 is obtained by causing the control point 30 to linearly extend and contract toward the saturation level 32. Further, a replacement ratio table 35 is obtained by causing a control point 34 to linearly extend and contract toward the saturation level 32 and move parallel so that the X coordinate of the control point 31 can overlap the saturation level 32.

Specifically, for example, an X coordinate of a control point is moved from p to p' using an equation (3) below. Here, the X coordinate p of the control point is determined using 1024 as a reference. Assuming that the amount of parallel movement P of a control point on this occasion is expressed by the following equation, P=My, the replacement ratio table 33 is obtained due to an extension-contraction rate Q=1 at the input upper limit Wt=2 My. Also, the replacement ratio table 35 is obtained due to an extension-contraction rate Q=0.1 at the input upper limit Wt=1.1 My.

[Mathematical expression 3]

$$p' = p - p \times \frac{1024 - p}{1024} \times Q \qquad (3)$$

$$Q = \frac{Wt - My}{My}$$

In the example described above, although it is assumed that the amount of parallel movement P is My so that the saturation level replacement ratio can be "1" when a color signal value is input, the relationship between the replacement ratio and the amount of parallel movement is not limited to this. For example, the amount of parallel movement P of a control point may be 0.9 My, and the replacement ratio may be "1" when the saturation level is nine-tenths or more.

In this case, in the replacement process in the step S16, by adding a value obtained by multiplying a difference between the color signal value x and the amount of parallel movement My by the replacement ratio to the colors signal value y, gradations can be expressed until the color signal value y to be replaced reaches the input upper limit Wt even after the replacement ratio becomes "1".

Figure 5:
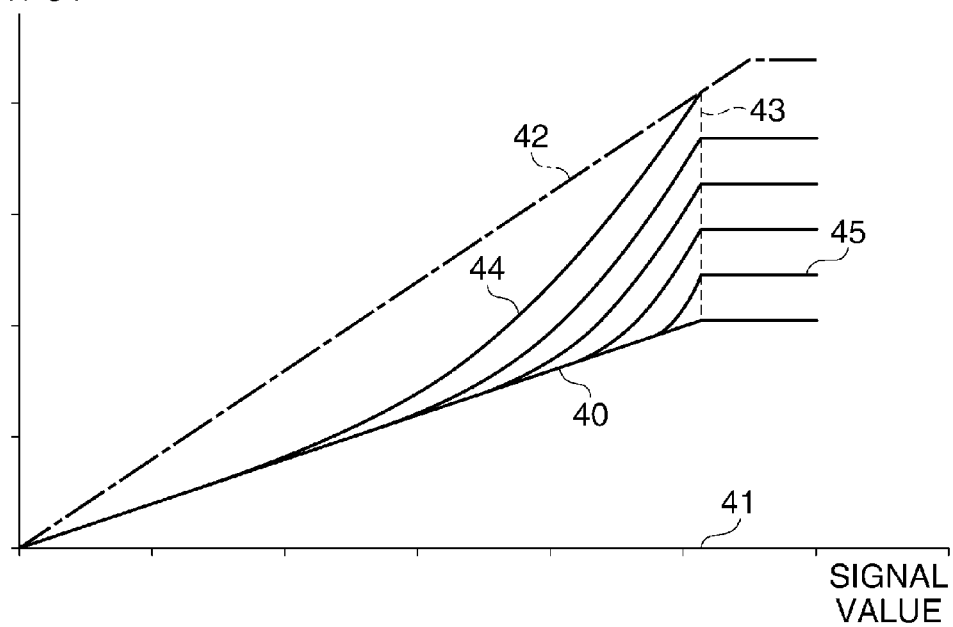
FIG. 5 is a view showing exemplary replacement results obtained when replacement ratio control is provided using the replacement ratio tables in FIG. 4 in the replacement process in FIG. 3.

FIG. 5 is a view showing exemplary replacement results obtained when replacement ratio control is provided using the replacement ratio tables in FIG. 4 in the replacement process in FIG. 3.

In FIG. 5, the axis of abscissa indicates color signal values, and the axis of ordinate indicates outputs from the replacement process unit 15 (replacement outputs). A reference number 41 designates a saturation level My of the control signal value y. A reference number 40 designates the color signal value y to be replaced, and further, A reference number 42 indicates the color signal value x that is to replace the colors signal y. A reference number 43 designates a replacement result obtained when y=x with no replacement ratio table being used in the step S16 in FIG. 3. In the example shown in FIG. 5, the color ratio between the color signal value y (40) and the color signal value x (42) is 1:2, and the output of the color signal value x (42) is twice as large as the color signal value y (40).

When the color signal value y (40) to be replaced reaches a saturation level My (41), the signal value greatly changes due to replacement with the color signal value x (42). This change presents itself as a tone jump in a developing result.

A reference number 44 designates a replacement result obtained when the replacement ratio table 33 is used. Here, the closer the color signal value y (40) to be replaced to the saturation level My (41), the higher the ratio of replacement with the color signal value x (42). When the color signal value y (40) becomes saturated, the color signal value y (40) is replaced with the color signal value x (42).

A reference number 45 designates a replacement result obtained when the replacement ratio table 35 is used. In the replacement result 45, an input value (that is, color signal value) at which replacement of the color signal value y (40) is started is greater than in the replacement result 44.

In both the replacement results 44 and 45, no saturation occurs under the saturation level My (41), and during adjustment of a dynamic range, the effect of changing the input upper limit can be seen without reversal of saturation states.

Figure 6A:
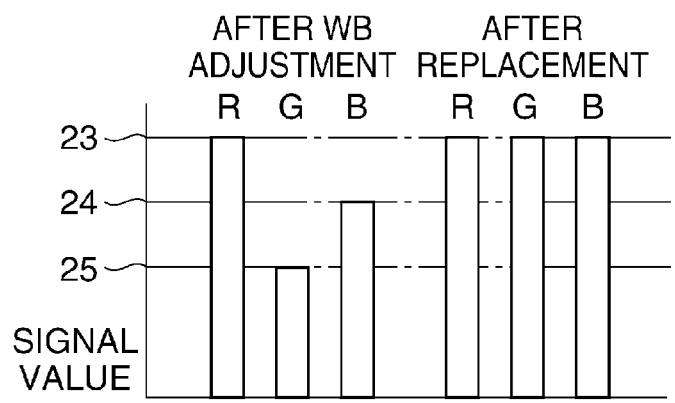
Figure 6B:
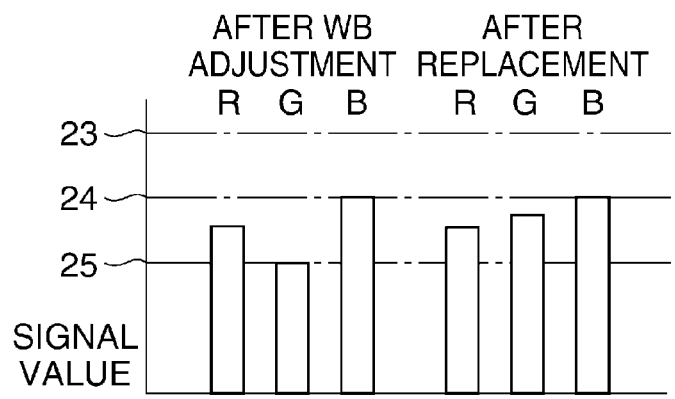
Figure 6C:
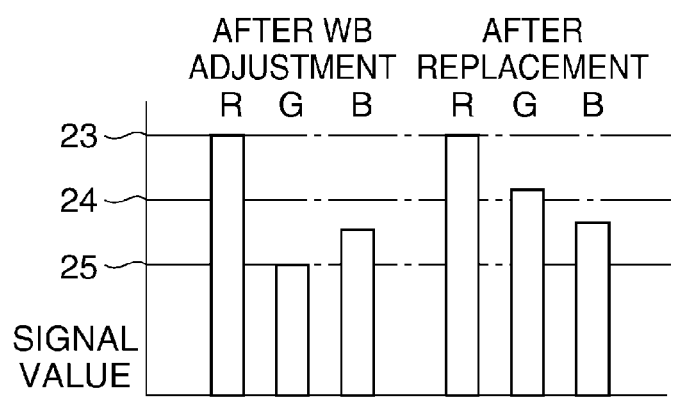
Figure 6D:
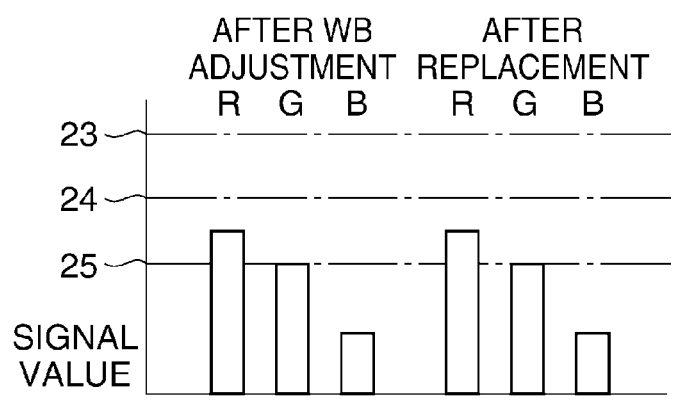

FIGS. 6A to 6D are diagrams useful in explaining RAW data after replacement, which is generated by the replacement process in FIG. 3. FIG. 6A is a diagram showing a state in which all the color signals R, G, and B have reached saturation levels after WB adjustment, and FIG. 6B is a diagram showing a state in which the color signals G and B have reached saturation levels after WB adjustment. FIG. 6C is a diagram showing a state in which the color signals R and G have reached saturation levels after WB adjustment. FIG. 6D is a diagram showing a state in which only the color signal G has reached a saturation level after WB adjustment.

In FIGS. 6A to 6D, the axis of ordinate indicates the magnitudes of signal values (that is, color signal value). In the example shown in FIG. 6A, all the color signals R, G, and B after WB adjustment have reached saturation levels 23, 25, and 24, respectively. When the replacement process described above with reference to FIG. 3 is carried out for the color signals R, G, and B, the color signal B is replaced with the color signal R in the step S16, and further, the color signal G is replaced with the replacement candidate value mix in the step S19. As a result, the signal values of the color signals R, G, and B after replacement reach the saturation level 23.

In the example shown in FIG. 6B, the signal values of the color signals G and B after WB adjustment have reached the saturation levels 25 and 24, respectively. When the replacement process described above with reference to FIG. 3 is carried out for the color signals R, G, and B, it is determined in the step S15 that the color signal R is smaller than the color signal B, and hence the color signal B is not replaced. On the other hand, in the step S19, the color signal G is replaced with the replacement candidate value mix.

As a result, the signal value of the color signal R after replacement is the same as the signal value of the color signal R after WB adjustment, and the signal value of the color signal G after replacement is the same as the average value of the signal values of the color signals R and B after WB adjustment. The signal value of the color signal B after replacement is the same as the signal value of the color signal B after WB adjustment.

In the example shown in FIG. 6C, the signal values of the color signals R and G after WB adjustment have reached the saturation levels 23 and 25, respectively. When the replacement process described above with reference to FIG. 3 is carried out for the color signals R, G, and B, the color signal B is replaced with the color signal R according to the replacement ratio table 33 in the step S16. On the other hand, in the step S19, the color signal G is replaced with the replacement candidate value mix.

As a result, the signal value of the color signal R after replacement is the same as the signal value of the color signal R after WB adjustment, and the signal value of the color signal G after replacement is the same as the average value of the signal values of the color signals R and B after WB adjustment. The signal value of the color signal B after replacement is greater than the signal value of the color signal B after WB adjustment.

In the example shown in FIG. 6D, the signal value of the color signal G after WB adjustment has reached the saturation level 25. When the replacement process described above with reference to FIG. 3 is carried out for the color signals R, G, and B, the color signal B is replaced with the color signal R according to the replacement ratio table 33 in the step S16, however, the replacement ratio is "0" because the color signal B is small. On the other hand, it is determined in the step S18 that the replacement candidate value mix is smaller than the signal value of the color signal G, and hence the color signal G is not replaced. As a result, the signal values of the color signal R, G, and B after replacement are the same as the signal values of the signal values of the color signals R, G, and B after WB adjustment.

Figure 7:
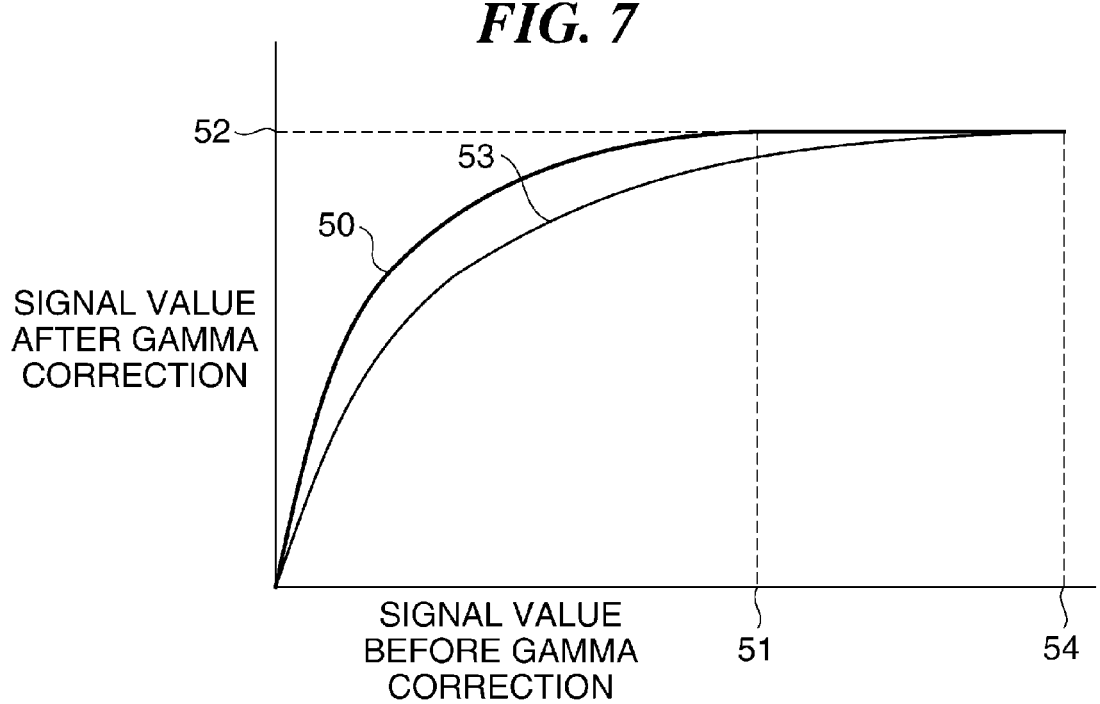
FIG. 7 is a diagram showing exemplary gamma curves which are used by a gamma correction unit in FIG. 1.

FIG. 7 is a diagram showing exemplary gamma curves which are used by the gamma correction unit 17 in FIG. 1.

In FIG. 7, the axis of abscissa indicates signal values before gamma correction, and the axis of ordinate indicates signal values after gamma correction. A gamma curve 50 is set based on the saturation level 23 and used by the gamma correction unit 17. An input upper limit to the gamma curve 50 is designated by a reference number 51, and an output upper limit after gamma correction is designated by a reference number 52.

A gamma curve 53 is used by the gamma correction unit 17 when the replacement process unit 15 carries out a replacement process. An input upper limit to the gamma curve 53 is designated by a reference number 54 and determined by the D range adjustment unit 13.

The gamma curve 53 is generated by linearly extending the input upper limit 51 to the gamma curve 50 up to the input upper limit 54. By performing gamma correction using the gamma curve 53, the gradation from the input upper limit 51 to the input upper limit 54 is reflected at or below the output upper limit 52 of the gamma correction unit 17.

Figure 8:
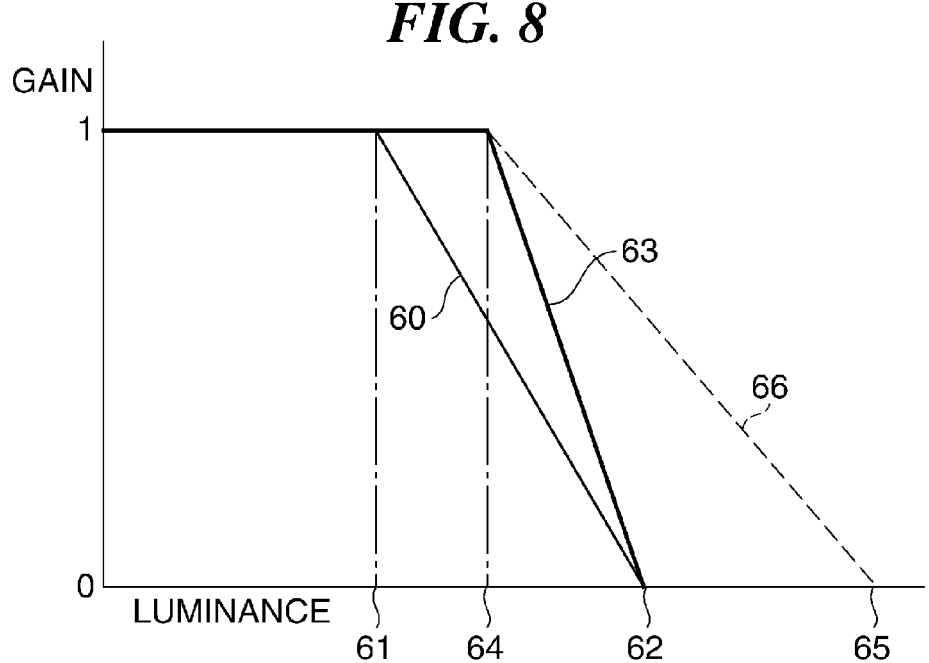
FIG. 8 is a diagram showing exemplary color suppression tables which are used by a color processing unit in FIG. 1.

FIG. 8 is a diagram showing exemplary color suppression tables which are used by the color processing unit 19 in FIG. 1.

In FIG. 8, the axis of abscissa indicates luminance, color difference, or color ratio, and the axis of ordinate indicates gain relative to color saturation. By referring to a color suppression table based on a signal value of each pixel in RAW data, the color processing unit 19 multiplies a color saturation of each pixel by a gain. As a result, the color processing unit 19 suppresses color in a high-luminance region of an image.

A color suppression table 60 is set based on the saturation level 23 and used by the color processing unit 19. A control point 61 is a starting point of color suppression. A control point 62 is an end point of color suppression. In the color suppression table 60, no color suppression is performed up to the control point 61, color suppression is gradually intensified from the control point 61 to the control point 62, and color is completely suppressed from the control point 62 onward.

A color suppression table 63 is used by the color processing unit 19 when the replacement process unit 15 carries out a replacement process. A control point 64 is a starting point of color suppression. The color suppression table 63 is generated by linearly extending the control point 61 of the color suppression table 60 up to the control point 64.

Here, the control point 61 is linearly extended up to the control point 64 by multiplying an extension magnification for the input upper limit 54 with respect to the input upper limit 51 of the gamma curves described above by a predetermined function. By using the color suppression table 63, color suppression from the control point 61 to the control point 62 can be weakened.

A control point 65 is an end point of color suppression. The control point 62 is linearly extended up to the control point 65 by multiplying an extension magnification for the control point 64 with respect to the control point 61 by a predetermined function. As a result, a color suppression table 66 is obtained. By using the color suppression table 66, color saturation lost by color suppression from the control point 64 to the control point 65 can be reproduced.

A description will now be given of exemplary RAW data obtained by the replacement process described above.

Figure 9A:
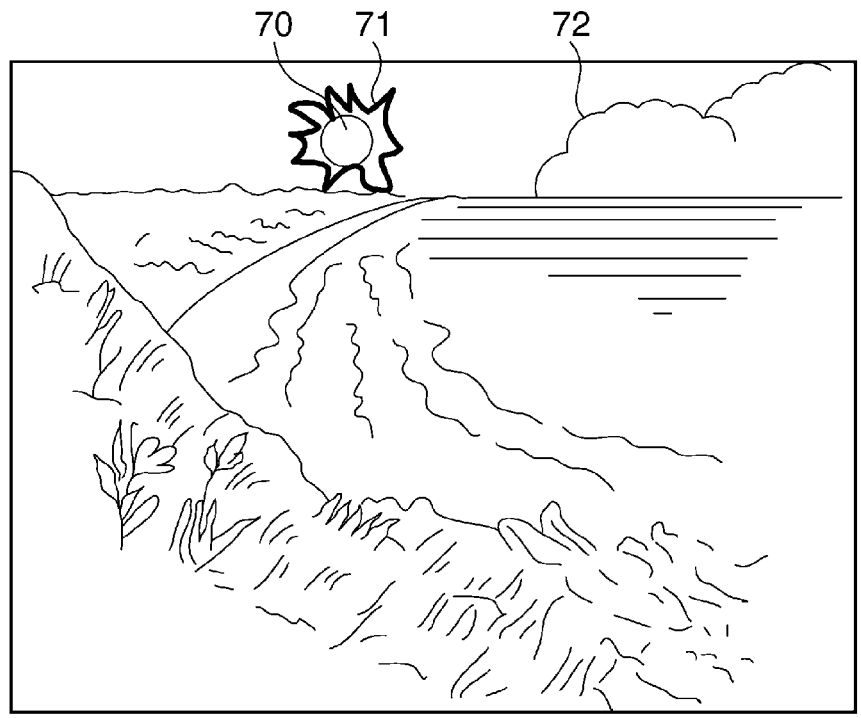
Figure 9B:
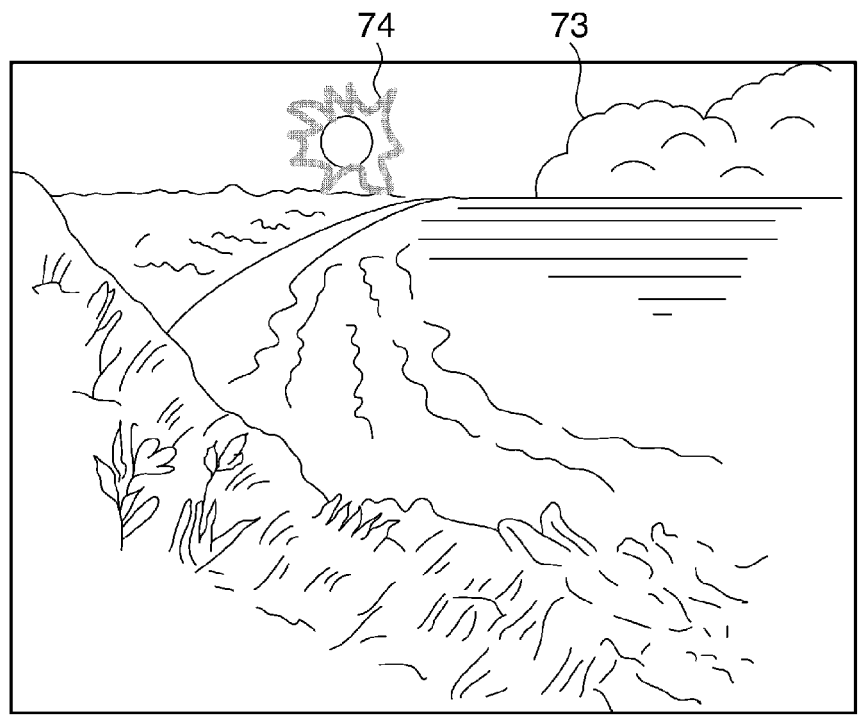

FIGS. 9A and 9B are views useful in explaining improvements in gradations in high-luminance regions by the replacement process carried out by the developing unit 2 in FIG. 1. FIG. 9A shows a conventional developing result, and FIG. 9B shows a developing result obtained according to the first embodiment.

Referring to FIGS. 9A and 9B, there is a flare 71 around the sun 70, and further, there is a cloud 72 which reflects light from the sun 70. At least the sun 70, the flare 71, and the cloud 72 are high-luminance regions.

In the developing result obtained by clipping in accordance with a minimum color signal after WB adjustment (FIG. 9A), the cloud 72 has blown out highlights due to an insufficient dynamic range. On the other hand, in the developing result shown in FIG. 9B, gradations of RAW data is used to the greatest extent possible, and hence a cloud 73 is resolved (the gradation of the cloud 73 is expressed). In the developing result shown in FIG. 9B, control is provided to gradually replace color signals exceeding a threshold value, a flare 74 around the sun 70 is expressed without causing a tone jump.

Thus, according to the first embodiment of the present invention, because gradations in high-luminance regions are improved due to replacement, and further, gains in the high-luminance regions are increased, colors in the high-luminance regions are faithfully expressed.

Further, according to the first embodiment, replacement is done such that replacement ratios are increased toward saturation levels using replacement ratio tables for controlling replacement ratios. As a result, color signal values sequentially change from pixel to pixel, so that a tone jump is prevented.

It should be noted that in the first embodiment described above, the color signal Y (40) is replaced with the color signal X (42), tone jumping of the color signal Z can be prevented in the same manner if the replacement candidate value mix is used in place of the color signal X (42), and the color signal Z is used in place of the color signal Y (40).

Next, a description will be given of a camera which is an image processing apparatus according to a second embodiment of the present invention.

It should be noted that the camera according to the second embodiment has the same arrangement as that of the camera in FIG. 1, and therefore, description thereof is omitted here. In the image processing apparatus according to the second embodiment, the same replacement process as the replacement process in FIG. 3 is carried out.

Figure 10:
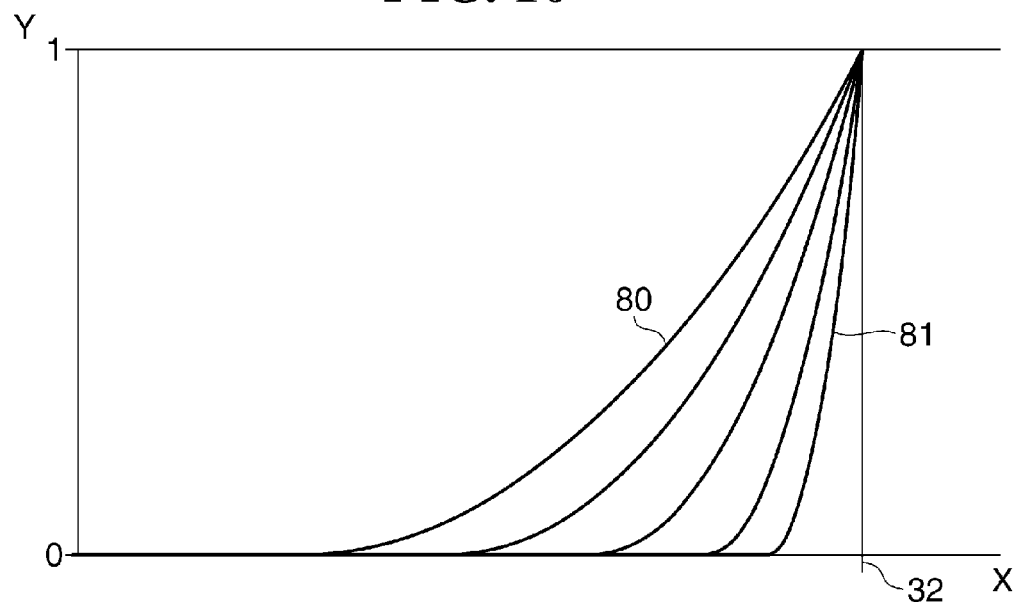
FIG. 10 is a diagram showing exemplary replacement ratio tables which are generated by a replacement ratio adjustment unit in an image processing apparatus according to a second embodiment of the present invention.

FIG. 10 is a diagram showing exemplary replacement ratio tables which are generated by the replacement ratio adjustment unit in the image processing apparatus according to the second embodiment.

In the example shown in FIG. 10, replacement ratio tables are generated according to exponential functions. The replacement ratio adjustment unit 14 calculates a replacement ratio for the color signal y according to an equation (4) below. A replacement ratio table 80 is obtained when the threshold value s=0 and the multiplier n=2 (the second power) where the convergence point R=My which is an input upper limit. A replacement ratio table 81 is obtained when the threshold value s=0.9 My and the multiplier n=2.

[Mathematical expression 4]

$$Fy(y) = 0 \quad (y < s) \quad (4)$$
$$Fy(y) = \left(\frac{y-s}{R-s}\right)^n \quad (s \leq y)$$

In the example described above, it is assumed that the convergence point R is My so that the saturation level replacement ratio at the time of input can be "1", the relationship between the replacement ratio and the convergence point R is not limited to this. For example, assuming that the convergence point R is 0.9 My, the replacement ratio may be "1" when the saturation level is nine-tenths or more.

Figure 11:
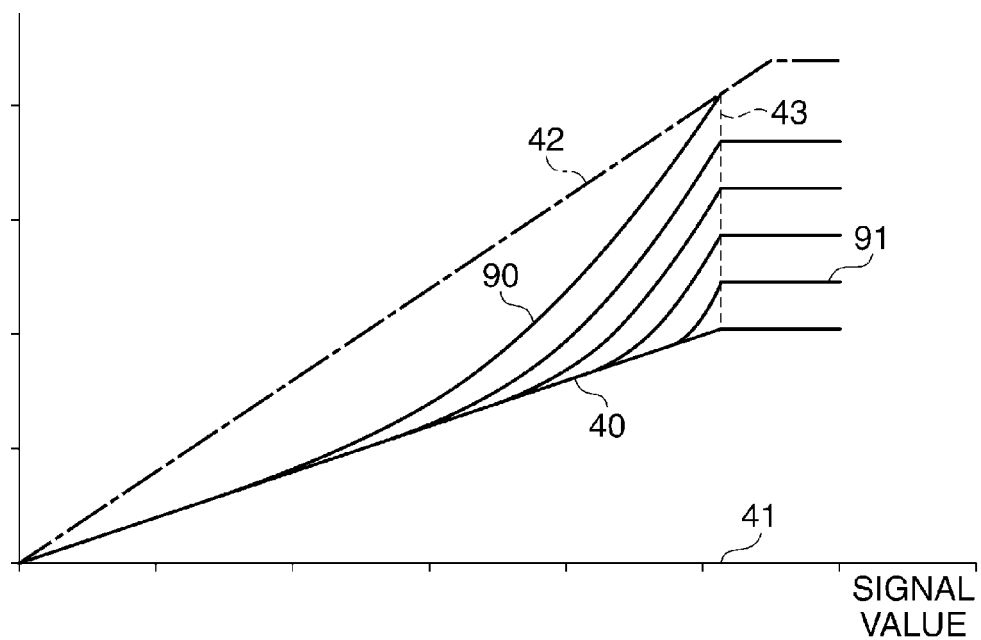
FIG. 11 is a diagram showing exemplary replacement results obtained when the replacement process in FIG. 3 is carried out using the replacement ratio tables in FIG. 10.

FIG. 11 is a view showing exemplary replacement results obtained when the replacement process in FIG. 3 is carried out using the replacement ratio tables in FIG. 10.

In FIG. 11, the axis of abscissa indicates color signal values, and the axis of ordinate indicates outputs from the replacement process unit 15 (replacement outputs). A reference number 90 designates a replacement result obtained when the replacement ratio table 80 is used. Here, the closer the color signal value y (40) to be replaced to the saturation level My (41), the higher the ratio of replacement with the color signal value x (42). When the color signal value y (40) becomes saturated, the color signal value y (40) is replaced with the color signal value x (42).

A reference number 91 designates a replacement result obtained when the replacement ratio table 81 is used. In the replacement result 91, an input value (that is, color signal value) at which replacement of the color signal value y (40) is started is greater than in the replacement result 90.

In both the replacement results 90 and 91, no saturation occurs under the saturation level My (41), and during adjustment of a dynamic range, the effect of changing the input upper limit can be seen without reversal of saturation.

Next, a description will be given of a camera which is an image processing apparatus according to a second embodiment of the present invention.

It should be noted that the camera according to the third embodiment has the same arrangement as that of the camera in FIG. 1, and therefore, description thereof is omitted here. In the image processing apparatus according to the third embodiment, the same replacement process as the replacement process in FIG. 3 is carried out.

Figure 12:
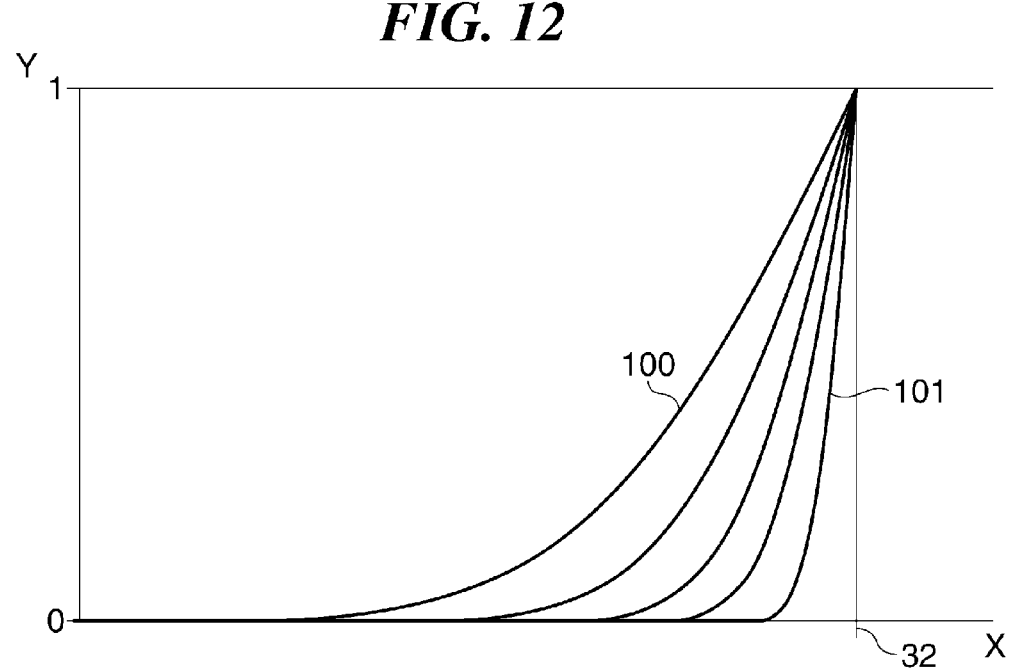
FIG. 12 is a diagram showing exemplary replacement ratio tables which are generated by a replacement ratio adjustment unit in an image processing apparatus according to a third embodiment of the present invention.

FIG. 12 is a diagram showing exemplary replacement ratio tables which are generated by the replacement ratio adjustment unit 14 in the image processing apparatus according to the third embodiment.

In the example shown in FIG. 12, replacement ratio tables are generated according to gauss functions. The replacement ratio adjustment unit 14 calculates a replacement ratio for the color signal y according to an equation (5) below. Namely, for each of the color signals, an average value and a variance is set according to the saturation level and an input upper limit, and for each of the color signals, a replacement ratio table is obtained by normalizing an integral obtained by integrating gauss functions until the saturation level has been reached.

Assuming that the convergence point R is My, a replacement ratio table 100 is obtained when the average value μ is My and the variance σ is 0.25 My. Also, a replacement ratio table 101 is obtained when the average value μ is My and the variance σ is 0.04 My.

[Mathematical expression 5]

$$Fy(y) = \frac{\sum_{0}^{y} e^{\frac{(y-\mu)^2}{2\sigma^2}}}{\sum_{0}^{R} e^{\frac{(y-\mu)^2}{2\sigma^2}}} \quad (5)$$

In the example described above, it is assumed that the convergence point R is My so that the replacement ratio for the saturation level at the time of input can be "1", the relationship between the replacement ratio and the convergence point R is not limited to this. For example, assuming that the convergence point R is 0.9 My, the replacement ratio may be "1" when the saturation level is nine-tenths or more.

Figure 13:
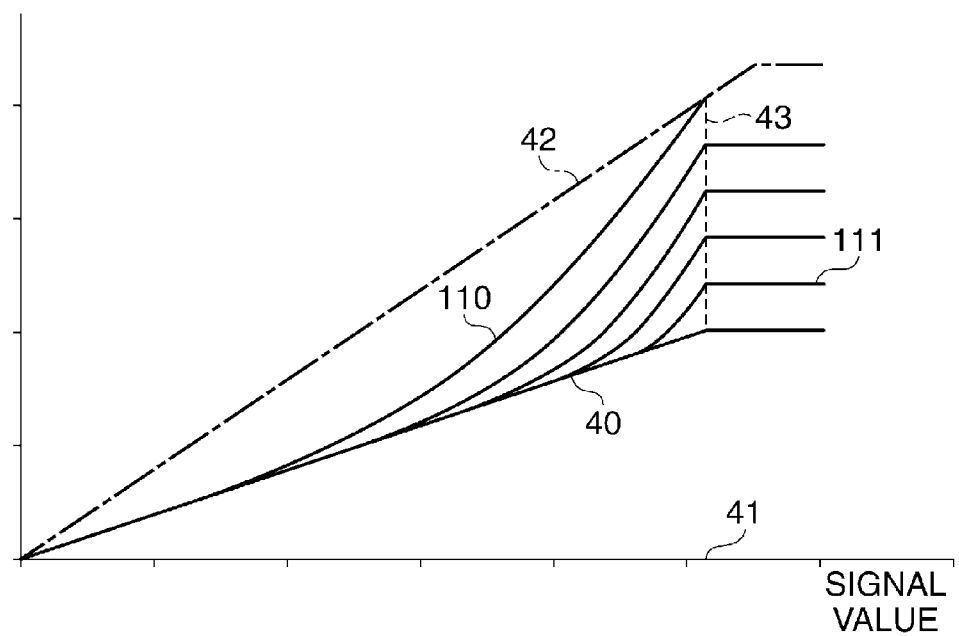
FIG. 13 is a diagram showing exemplary replacement results obtained when the replacement process in FIG. 3 is carried out using the replacement ratio tables in FIG. 12.
Figure 14:
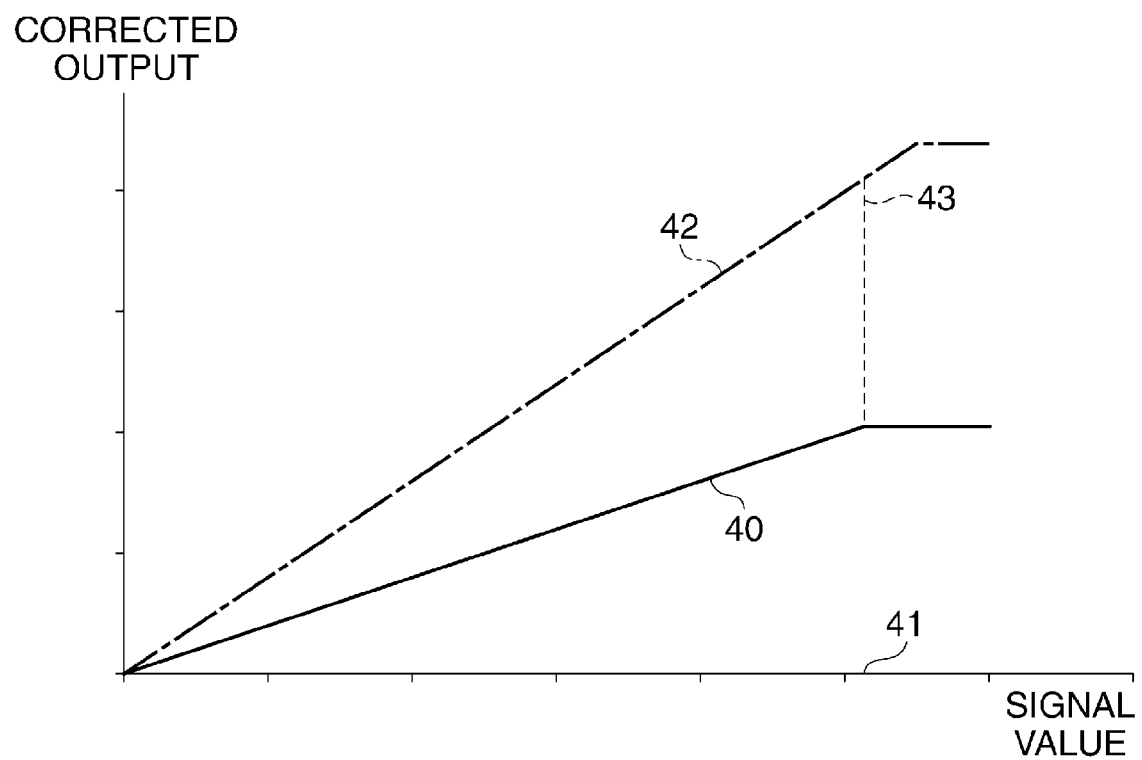
FIG. 14 is a diagram showing results obtained when corrections are made for a subject whose color ratio is greater than 1 in a conventional image processing apparatus.

FIG. 13 is a view showing exemplary replacement results obtained when the replacement process in FIG. 3 is carried out using the replacement ratio tables in FIG. 12.

In FIG. 13, the axis of abscissa indicates color signal values, and the axis of ordinate indicates outputs from the replacement process unit 15 (replacement outputs). A reference number 110 designates a replacement result obtained when the replacement ratio table 100 is used. Here, the closer the color signal value y (40) to be replaced to the saturation level My (41), the higher the ratio of replacement with the color signal value x (42). When the color signal value y (40) becomes saturated, the color signal value y (40) is replaced with the color signal value x (42).

A reference number 111 designates a replacement result obtained when the replacement ratio table 101 is used. In the replacement result 111, an input value (that is, color signal value) at which replacement of the color signal value y (40) is started is greater than in the replacement result 110.

In both the replacement results 110 and 111 no saturation occurs under the saturation level My (41), and during adjustment of a dynamic range, the effect of changing the input upper limit can be seen without reversal of saturation.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-031632, filed Feb. 21, 2014, which is hereby incorporated by reference herein in its entirety.

What is claimed is:

1. An image processing apparatus which develops photographed data to obtain developed data, comprising:
   a saturation level calculation unit configured to calculate saturation levels of respective color signals in the photographed data;
   an upper limit determination unit configured to determine an upper limit of a dynamic range in the photographed data;
   a replacement ratio calculation unit configured to, based on the upper limit, obtain replacement ratios for the color signals, which change toward the saturation levels of the color signals;
   an adjustment unit configured to adjust each of the color signals according to the upper limit;
   a replacement process unit configured to carry out a replacement process in which a color signal of which the saturation level is low is replaced with a color signal of which the saturation level is high based on the replacement ratio; and
   a development process unit configured to obtain the developed data by carrying out a predetermined process on the photographed data subjected to the replacement process by said replacement process unit.

2. The image processing apparatus according to claim 1, wherein the replacement ratios monotonously increase toward the saturation levels of the color signals.

3. The image processing apparatus according to claim 1, wherein as the upper limit increases, said replacement ratio calculation unit widens a range to be replaced based on the replacement ratio in a color signal of which the saturation level is low.

4. The image processing apparatus according to claim 1, wherein said saturation level calculation unit calculates the saturation levels based on a saturation value of an image pickup device which has obtained the photographed data and a white balance coefficient for use in adjusting white balance of the photographed data.

5. The image processing apparatus according to claim 1, wherein said replacement process unit carries out the replacement process by adding a multiplication result obtained by multiplying a color signal to be replaced by (1−replacement ratio) to a multiplication result obtained by multiplying a color signal that is to replace the color signal by the replacement ratio.

6. The image processing apparatus according to claim 1, wherein said replacement process unit carries out the replacement process by adding a multiplication result obtained by multiplying a difference between a color signal to be replaced and a color signal that is to replace the color signal by the replacement ratio to the color signal to be replaced.

7. The image processing apparatus according to claim 1, wherein said replacement process unit carries out the replacement process by adding a multiplication result obtained by multiplying a difference in saturation level between a color signal to be replaced and a color signal that is to replace the color signal by the replacement ratio to the color signal to be replaced.

8. The image processing apparatus according to claim 1, wherein prior to the replacement process by said replacement process unit, said adjustment unit carries out a threshold process in which a color signal exceeding the upper limit is replaced with the upper limit.

9. The image processing apparatus according to claim 1, wherein prior to the replacement process by said replacement process unit, said adjustment unit carries out a compression process on a color signal exceeding the upper limit so that the saturation level of this color signal falls within the upper limit.

10. The image processing apparatus according to claim 1, wherein for a color signal for use in the replacement process on another color signal, said adjustment unit carries out a compression process so that the saturation level of this color signal falls within the upper limit prior to the replacement process by said replacement process unit, and for the other color signal, said adjustment unit carries out a threshold process in which a color signal exceeding the upper limit is replaced with the upper limit prior to the replacement process by said replacement process unit.

11. The image processing apparatus according to claim 1, wherein for each of the color signals, said replacement ratio calculation unit sets an amount of parallel movement for a control point in each of the color signals according to the saturation level and the upper limit, and calculates the replacement ratio by moving a control point corresponding to a replacement ratio determined in advance parallel according to the amount of parallel movement.

12. The image processing apparatus according to claim 1, wherein for each of the color signals, said replacement ratio calculation unit sets a threshold value and a multiplier n according to the saturation level and the upper limit, and for the color signal exceeding the threshold value, calculates the replacement ratio by raising (signal value−threshold value)/(upper limit−threshold value) to the power of n.

13. The image processing apparatus according to claim 1, wherein for each of the color signals, said replacement ratio calculation unit sets an average value and a variance according to the saturation level and the upper limit, and for each of the color signals, calculates the replacement ratio by normalizing an integral obtained by integrating gauss functions until the saturation level has been reached.

14. The image processing apparatus according to claim 1,
   wherein said development process unit further comprises a gamma correction unit that corrects a contrast of an image and the dynamic range, and
   wherein the gamma correction unit linearly extends a gamma curve set based on a maximum saturation level among the saturation levels calculated by said saturation level calculation unit, and corrects the contrast and the dynamic range according to the extended gamma curve.

15. The image processing apparatus according to claim 1,
   wherein said development process unit further comprises a color process unit that adjusts a hue of an image and suppresses color curving in a high-luminance region of the image, and
   wherein the color process unit linearly extends a color suppression table set based on a maximum saturation level among the saturation levels calculated by said saturation level calculation unit, and adjusts the hue and suppresses the color curving in the high-luminance region according to the extended color suppression table.

16. The image processing apparatus according to claim 1, further comprising an optical correction unit configured to reduce peripheral illumination arising from a lens provided in an image pickup unit for obtaining the photographed data, and eliminates chromatic aberration of magnification and chromatic aberration and corrects for distortion,
   wherein said replacement process unit carries out the replacement process for photographed data corrected by said optical correction unit, and said development process unit comprises a noise removal unit that removes luminance noise and color noise by carrying out a filtering process or a hierarchical process on photographed data subjected to the replacement process by said replacement process unit.

17. The image processing apparatus according to claim 1, further comprising an optical correction unit configured to reduce peripheral illumination arising from a lens provided in an image pickup unit for obtaining the photographed data, and eliminates chromatic aberration of magnification and chromatic aberration and corrects for distortion, wherein for photographed data subjected to the replacement process by said replacement process unit, said optical correction unit reduces the peripheral illumination, removes the chromatic aberration of magnification and the chromatic aberration and corrects for the distortion.

18. An image processing method for an image processing apparatus which develops photographed data to obtain developed data, comprising:

a saturation level calculation step of calculating saturation levels of respective color signals in the photographed data;

an upper limit determination step of determining an upper limit of a dynamic range in the photographed data;

a replacement ratio calculation step of, based on the upper limit, obtaining replacement ratios for the color signals, which change toward the saturation levels of the color signals;

an adjustment step of adjusting each of the color signals according to the upper limit;

a replacement process step of carrying out a replacement process in which a color signal of which the saturation level is low is replaced with a color signal of which the saturation level is high based on the replacement ratio; and a development process step of obtaining the developed data by carrying out a predetermined process on the photographed data subjected to the replacement process in said replacement process step.

19. A non-transitory computer-readable storage medium storing a control program for causing a computer to execute a control method for an image processing apparatus which develops photographed data to obtain developed data, the control method comprising:

a saturation level calculation step of calculating saturation levels of respective color signals in the photographed data;

an upper limit determination step of determining an upper limit of a dynamic range in the photographed data;

a replacement ratio calculation step of, based on the upper limit, obtaining replacement ratios for the color signals, which change toward the saturation levels of the color signals;

an adjustment step of adjusting each of the color signals according to the upper limit;

a replacement process step of carrying out a replacement process in which a color signal of which the saturation level is low is replaced with a color signal of which the saturation level is high based on the replacement ratio; and a development process step of obtaining the developed data by carrying out a predetermined process on the photographed data subjected to the replacement process in the replacement process step.

* * * * *